(12) United States Patent
Ito et al.

(10) Patent No.: US 6,907,613 B2
(45) Date of Patent: Jun. 14, 2005

(54) DISK DEVICE

(75) Inventors: Masatoshi Ito, Iwaki (JP); Nobuyuki Niiya, Iwaki (JP); Osamu Watanabe, Iwaki (JP); Satoshi Haga, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 146 days.

(21) Appl. No.: 10/341,548

(22) Filed: Jan. 13, 2003

(65) Prior Publication Data

US 2003/0161226 A1 Aug. 28, 2003

(30) Foreign Application Priority Data

Jan. 17, 2002 (JP) ......................................... 2002-008650

(51) Int. Cl.⁷ .......................... G11B 33/02; G11B 23/00
(52) U.S. Cl. ..................................... 720/657; 369/263.1
(58) Field of Search .......................... 720/657; 369/263, 369/30.88, 77.11, 77.21

(56) References Cited

U.S. PATENT DOCUMENTS

| 6,157,607 | A | 12/2000 | Nakamichi |
| 6,301,205 | B1 | 10/2001 | Nakamichi |
| 6,580,668 | B2 * | 6/2003 | Nagasaka et al. ........ 369/30.85 |
| 6,731,582 | B2 * | 5/2004 | Abe ........................... 369/77.1 |

* cited by examiner

*Primary Examiner*—Allen Cao
(74) *Attorney, Agent, or Firm*—Brinks Hofer Gilson & Lione

(57) ABSTRACT

A disk device has a driving unit supported by elastic members. In a standby state, locking of the driving unit by a lock member is disengaged, so that the driving unit is elastically supported by dampers and a coil spring. This reduces the time of restriction by pins, thereby preventing damage to the pins. The lock member is operated at the time of receiving a disk, thereby locking the driving unit. Thus, the driving unit does not need to be locked in the casing for prolonged periods of time.

20 Claims, 11 Drawing Sheets

DISK DEVICE

BACKGROUND OF THE INVENTION

1. Field of the Invention

The present invention relates to a disk device wherein a driving unit comprising a rotational driving unit and a head is elastically supported within a casing.

2. Description of the Related Art

Disk devices such as those designed for mounting in vehicles have a driving unit including a rotational driving unit for rotating disks and an optical head elastically supported within a casing by an elastic member such as dampers.

In a standby state waiting for a disk to be inserted from an insertion opening, the driving unit engages a locking member within the casing and is placed in a locked state, thereby facilitating guiding of the disk inserted from the insertion opening to the driving unit.

Once the disk has been clamped by the rotational driving unit, the lock of the driving unit is disengaged, and thus the driving unit is elastically supported by the dampers or the like. Accordingly, undesirable effects on playback and recording can be prevented even in the event that there are external vibrations applied during driving of the disk and using the optical head for playback or recording, since the vibrations will be absorbed.

Also, with disk devices wherein a stock unit is provided for stocking multiple disks within the casing, the driving unit is locked at the time of transferring disks between the rotational driving unit and the stock unit, thereby enabling disk transfer to be performed between the rotational driving unit and a predetermined area within the stock unit in a sure manner.

However, in the event that the driving unit is in a locked state by the locking member when in the standby state for waiting for a disk as described above, the driving unit is kept in a locked state for long periods of time. Accordingly, the state wherein the driving unit and the locking member are constantly fit one to another is maintained for a long time, leading to fatigue, deformation, destruction, etc., of the lock-engaged portion due to external vibrations or the like. Also, there is the concern that the elasticity of the elastic supporting member, such as dampers or the like, might be lost due to the constant application of external force.

Further, in the event that the locked state of the driving unit continues for a long time, vehicle vibrations or the like, for example, continuously act upon the driving unit, leading to problems of fatigue of mechanisms within the driving unit due to vibrations, or chattering noise due to vibration of mechanisms within the driving unit.

Also, with conventional disk devices, because the driving unit is in a locked state when transferring disks to the insertion opening or when transferring disks between the rotational driving unit and the stock unit, in the event that an operation error occurs during these operations and recovery therefrom cannot be effected, the disk stops partway through the operation, and furthermore, the operation stops with the driving unit in a locked state.

In the event that such a phenomenon occurs, repairs must be made, but the disk has stopped partway through an operation and accordingly is susceptible to becoming scratched. Further, the driving unit is left locked, allowing secondary malfunctioning such as damaging of the lock-engaged portions, for example.

SUMMARY OF THE INVENTION

The present invention has been made to solve the above problems of conventional arrangements, and accordingly, it is an object thereof to provide a disk device whereby the driving unit can be prevented from being left in a locked state for long periods of time, and also wherein the driving unit can be prevented from stopping in a locked state in the event that an operation error occurs.

According to a first aspect of the present invention, a disk device comprises: a driving unit having a rotational driving unit for clamping a disk, and a head facing the disk; an elastic supporting member for supporting the driving unit within a casing; a locking member for locking the driving unit within the casing; and a transfer unit for transferring disks between an insertion opening and the rotational driving unit; wherein, in a standby state with no disk inserted from the insertion opening, the locking member is positioned in a lock release direction, with the driving unit being elastically supported by the elastic supporting member.

The disk device may further comprise a control unit which operates the locking member to place the driving unit in a locked state in the event of a disk being inserted from the insertion opening.

With the present invention, in a standby state waiting for the reception of a disk, the driving unit is maintained in an elastically supported state, so fatigue and damage to the locked-engaged portion can be prevented, and chattering noise of mechanisms within the driving unit can be prevented. Also, the driving unit is locked at the time of receiving a disk, so the disk can be introduced within the driving unit in a sure manner.

The disk device may further comprise a control unit for, in the event that an operation error occurs during an operation of discharging a disk clamped by the rotational driving unit to the insertion opening, returning the disk to the rotational driving unit with the transfer unit so as to be clamped, and stopping the operation with the locking state of the locking member released.

The disk device may further comprise a control unit wherein, in the event that a disk clamped by the rotational driving unit is discharged to the insertion opening and the transfer unit is stopped in a state in which the disk protrudes from the insertion opening, but the disk is not extracted from the insertion opening within a predetermined amount of time, the disk is returned to the rotational driving unit by the transfer unit and clamped, and the operation is stopped with the locking state of the locking member released.

According to a second aspect of the present invention, a disk device comprises: a driving unit having a rotational driving unit for clamping a disk, and a head facing the disk; an elastic supporting member for supporting the driving unit within a casing; a locking member for locking the driving unit within the casing; a stock unit capable of storing a plurality of disks; a transfer unit for transferring disks between the stock unit and the rotational driving unit; and a control unit for, in the event that an operation error occurs during the operation of supplying a disk clamped by the rotational driving unit to the stock unit, returning the disk to the rotational driving unit with the transfer unit so as to be clamped, and stopping the operation with the locking state of the locking member released.

As described above, in the event that an operation error occurs during the disk discharging operation or the disk transfer operation to the stock unit, the operations are stopped such that the driving unit is in an elastically supported state, thereby preventing damage to the lock-engaged portion while awaiting repair, for example; and the operations are stopped with the disk clamped by the rotational driving unit, making damage to the disk less likely.

DESCRIPTION OF THE PREFERRED EMBODIMENTS

The following is a description of preferred embodiments of the present invention with reference to the drawings.

Figure 1:
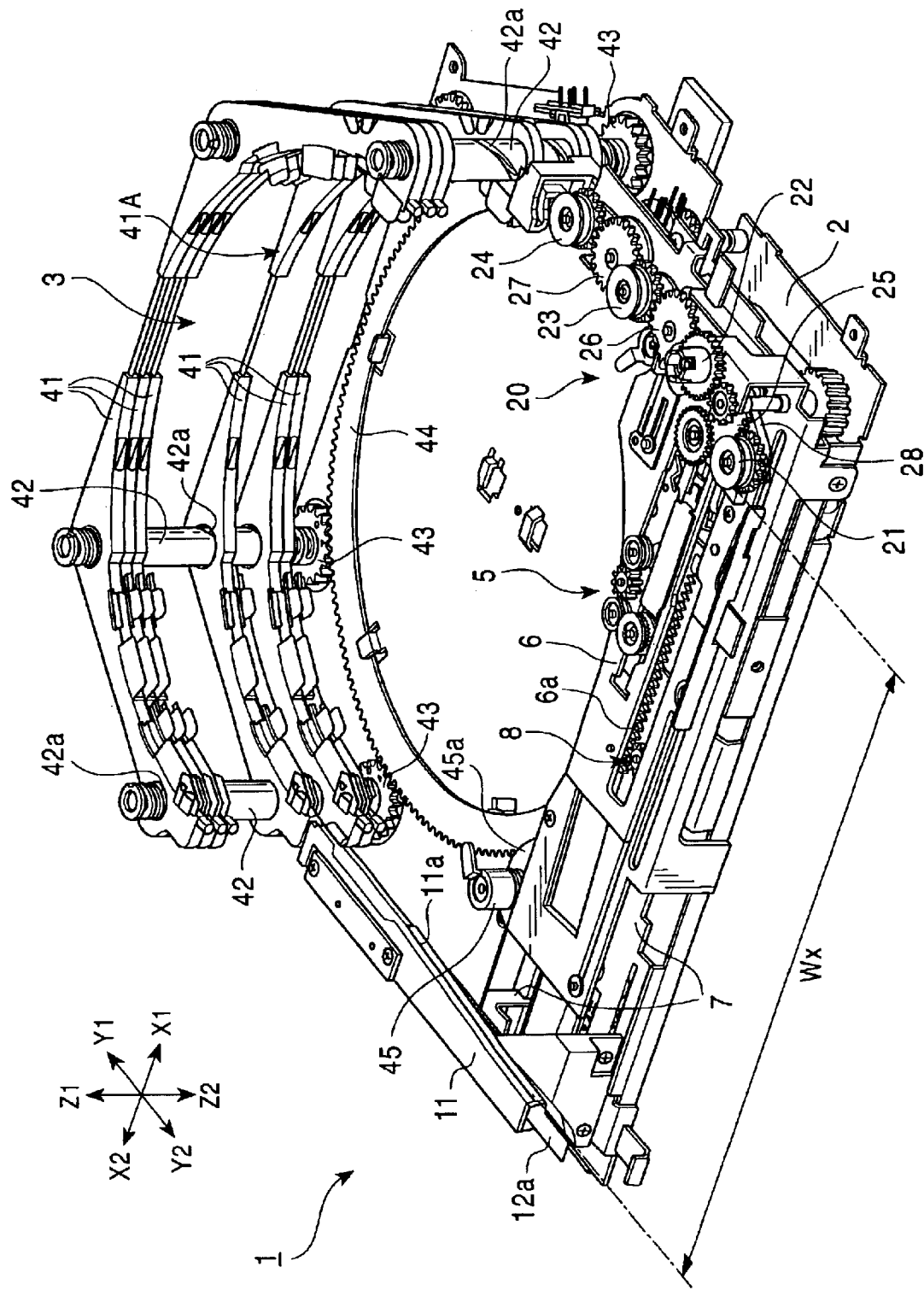
FIG. 1 is a perspective view illustrating the principal components of a disk device according to the present invention.
Figure 2:
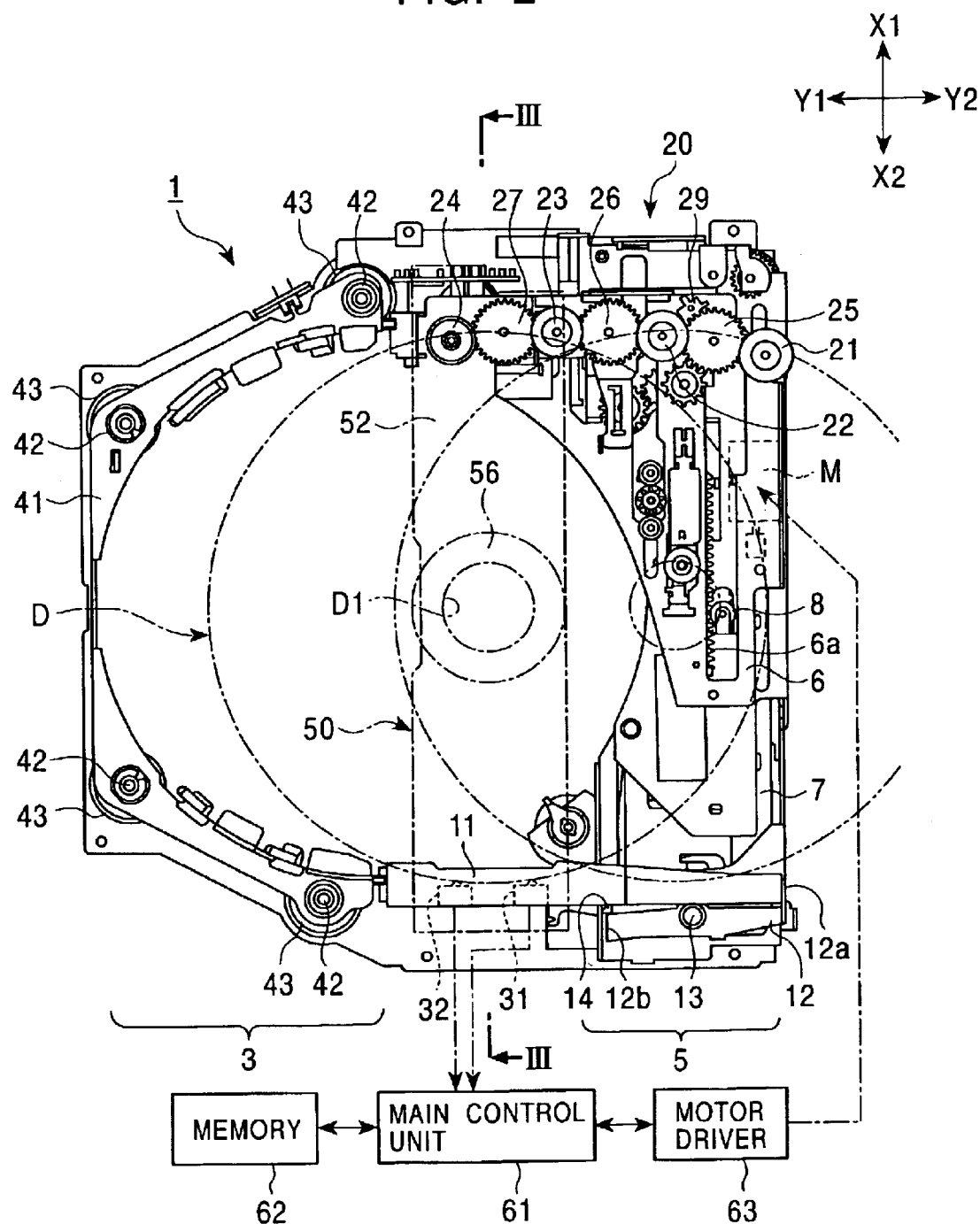
FIG. 2 is a plan view of the disk device.
Figure 3:
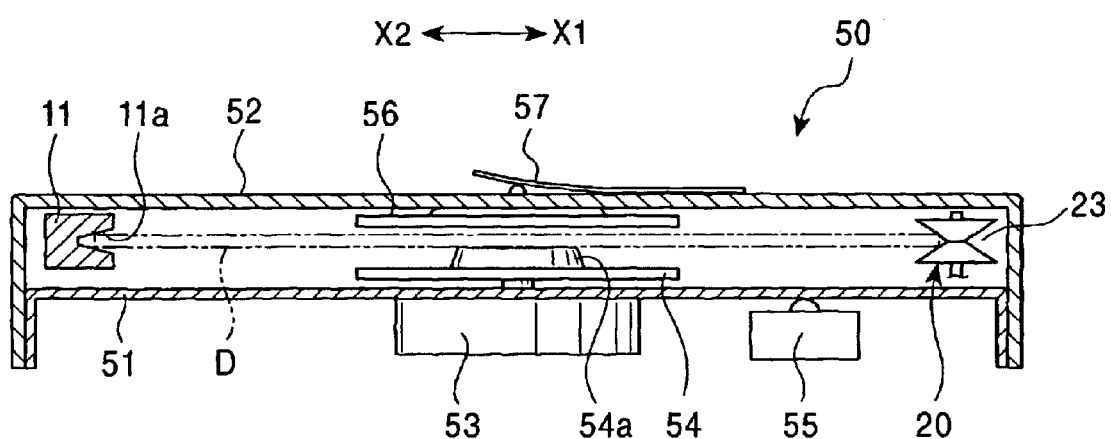
FIG. 3 is a cross-sectional view along line III—III in FIG. 2.
Figure 4:
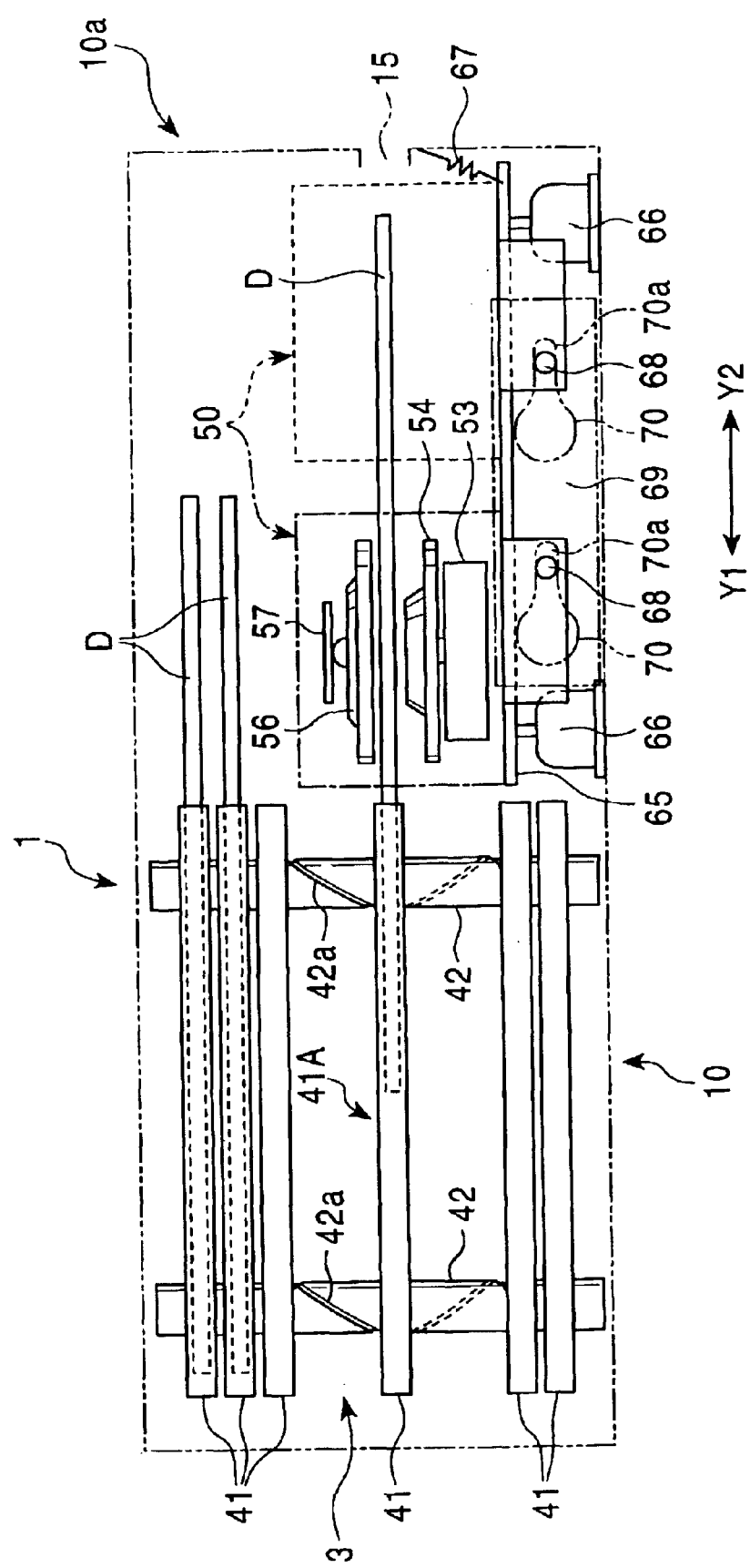
FIG. 4 is a side view of the disk device.

FIG. 1 is a perspective view illustrating an example of the internal configuration of a disk device according to the present invention, FIG. 2 is a plan view thereof, FIG. 3 is a cross-sectional view along line III—III in FIG. 2, and FIG. 4 is a side view illustrating the internal configuration of the disk device.

The disk device 1 shown in FIGS. 1 and 2 can perform playback and recording of various types of disks, such as CDs (Compact Disks) with a diameter of 8 cm (small disks), disks with a diameter of 12 cm (large disks), DVDs (Digital Versatile Disks), and so forth. Multiple large disks with a 12 cm diameter may be stocked in the disk device, from which they are selected and driven.

As shown in FIG. 4, a face unit (not shown) having a liquid crystal panel and various types of switches is provided on the front (Y2) side of the casing 10 of the device main unit. A slit-shaped insertion opening 15 extending in the width direction is provided in the face unit. A stock unit 3 capable of stacking multiple large disks vertically (in the Z direction) is provided at the far Y1 side of the disk device 1, and large disks are held individually by disk holders 41 provided in the stock unit 3 and stored in a vertically stacked state.

As shown in FIGS. 1 and 2, a disk transporting unit 5 for carrying disks in and out is provided at the position between the insertion opening 15 provided in the face unit and the stock unit 3. The disk transporting unit 5 comprises a first transfer member 6 and a second transfer member 7, provided so as to move in the width direction (X1–X2 direction) on a base 2. A rack 6a is provided on the first transfer member 6, and a rack (not shown in drawings) facing the rack 6a is provided on the second transfer member 7. A linking gear which is rotationally driven by a setting motor M shown in FIG. 2 is provided on the base 2 as a spacing setting unit, and the linking gear 8 meshes with both the rack 6a of the first transfer member 6 and the rack of the second transfer member 7. When the linking gear 8 is rotated by the setting motor M, the first transfer member 6 and the second transfer member 7 move in a direction wherein the transfer members approach one another, or in a direction wherein the transfer members move apart from one another, synchronously.

A guide member (guide unit) 11 extending in the Y1–Y2 directions in the diagram, which are the directions for carrying disks in and out, is provided at the second transfer member 7. A guide groove 11a for guiding is formed on the inner face of the guide member 11 (the X1 side in the drawing), extending in the Y direction in the drawing. As shown in FIG. 3, the cross-sectional configuration of the guide groove 11a is V-shaped wherein the open side which is at the X1 side in the drawing is wide and the X2 side thereof is narrow.

A detecting arm (detecting member) 12 is provided at the end of the discharging side (Y2 side) of the guide member 11. The detecting arm 12 is supported so as to rotate clockwise and counterclockwise around a shaft 13 shown in FIG. 2, and is tensioned in the counterclockwise direction by a tension member not shown in the drawings.

A detecting tab 12a protrudes from the detecting arm 12 and is positioned at the end of the discharging side of the guide member 11. In the event that the detecting tab 12a is pressed to the outside (X2 direction) by the outer edge of a disk D inserted in the guide groove 11a of the guide member 11, the detecting arm 12 rotates in the clockwise direction.

A pressing tab 12b protrudes in the downward direction in the drawing at the other end of the detecting arm 12, and the pressing tab 12b faces an activator of an insertion detecting switch 14. When the detecting arm 12 is rotated in the clockwise direction, the insertion detecting switch 14 is switched on by the pressing tab 12b. When the detecting arm 12 is rotated in the counterclockwise direction, and the detecting tab 12a covers the end of the discharging side (Y2 side) of the guide groove 11a of the guide member 11, the pressing tab 12b is separated from the activator of the insertion detecting switch 14, and the insertion detecting switch 14 is switched off.

A transporting unit 20 made up of first through fourth transporting rollers 21, 22, 23, and 24, arrayed in the direction of insertion of the disk D (Y direction), is provided on the first transfer member 6, facing the guide member 11. As shown in FIG. 3, the first through fourth transporting rollers 21, 22, 23, and 24, are each configured as if it were of two flanges with the smaller side of each flange facing one another, so that the roller has an hourglass-shaped cross-sectional form along the axis thereof, and the outer edge of the disk D is held within the V-shaped groove between the flanges.

A transporting motor not shown in the drawings is provided in the device, and the driving force of the transporting motor is reduced by reduction gears, and is transmitted through transmission gears 25, 26, 27, etc., to each of the transporting rollers, 21, 22, 23, and 24, with all of the first through fourth transporting rollers 21, 22, 23, and 24 being rotationally driven in the same direction. When the first through fourth transporting rollers 21, 22, 23, and 24, rotate clockwise, the disk D is transported toward the back of the device (Y1 direction), and when rotating counterclockwise, the disk D is transported in the opposite direction (Y2 direction).

As shown in FIG. 1, a rotational arm 28 which can rotate over a predetermined angular range with the supporting shaft as the fulcrum thereof is provided on the first transfer member 6, and the first transporting roller 21 is supported by the tip of the rotational arm 28. The rotational arm 28 is tensioned in the clockwise direction at all times by a tension member such as a pulling coil spring or the like. An insertion detecting switch 29 (see FIG. 2), which is switched on when the rotational arm 28 is rotated by a predetermined angle in the counterclockwise direction, is provided on the first transfer member 6.

A linear position sensor (not shown), for detecting the shifting position in the X direction of the second transfer member 7, is provided on the base 2. The linear position sensor is a linear variable resistor, for example, and can detect the position of the second transfer member 7, thereby enabling detection of the spacing Wx between the guide member 11 and the transporting unit 20 which face each other.

Figure 5:
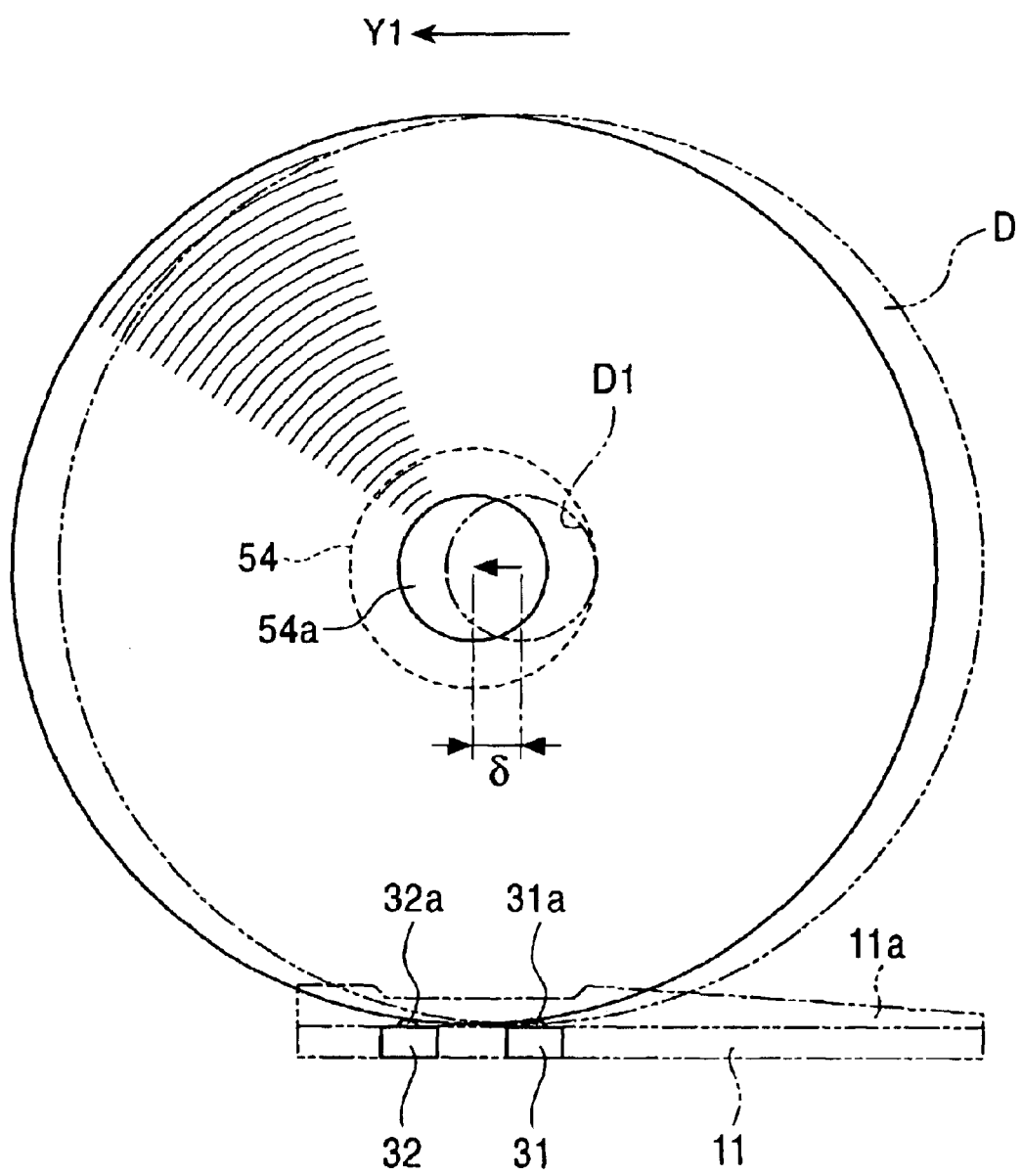
FIG. 5 is a plan view illustrating the relationship between a large disk being transferred and a detecting switch.

As shown in FIG. 2, a first detecting switch 31 and a second detecting switch 32 are provided on the guide member 11. The first detecting switch 31 and the second detecting switch 32 function as detecting units for the clamping position, that is, for detecting that the disk has moved to the clamping position. The activators 31a and 32a of the first detecting switch 31 and the second detecting switch 32 are situated along and within the guide groove 11a of the guide member 11, as shown in FIG. 5. In the event that an activator 31a or 32a is pressed by the edge of the moving disk in the guide groove 11a, the corresponding detecting switch is turned on.

Disk holders 41, for holding the outer edge of large disks 12 cm in diameter which are carried in between the guide member 11 and transporting unit 20, are provided in the stock unit 3. Several of these disk holders (six, in the case of the embodiment shown in the drawings) are provided in the direction of the thickness of the disks, stacked vertically.

Multiple guide supports 42 are rotationally disposed vertically on the base 2. A small gear 43 is integrally provided at each base end of the guide supports, and a large ring-shaped gear 44 engaging each of the small gears 43 is provided on the base 2. The ring-shaped gear 44 is rotationally driven by a selecting motor not shown in the drawings, thereby synchronously rotating the guide supports 42.

A screw groove 42a is formed on the perimeter of each of the guide supports 42. The screw groove has a configuration wherein the pitch thereof is small at the top and bottom portions, and the pitch thereof is large in the middle position. A protrusion which engages the screw groove 42a of the guide support 42 is provided on the disk holder 41. When the guide supports 42 rotate, each disk holder 41 is moved vertically by the screw groove 42a.

As described above, the disk holders 41 are stacked so as to overlap each other in high density at the top portion and the bottom portion, due to the small pitch at the top portion and the bottom portion of the guide supports 42. Also, a disk holder 41 can move vertically away from the adjacent disk holders, due to the low density of the pitch of the screw grooves 42a at the middle portion of the guide supports 42. One of the disk holders 41 is selected by the operation of moving the disk holders 41 in the vertical direction, the selected disk holder 41 is transferred to the selection position 41A of which is at the same height as the guide member 11 and the transporting member 20 as shown in FIG. 1, and is stopped.

As shown in FIG. 1, a selection detecting unit 45 is provided on the base 2. This selection detecting unit 45 comprises a gear 45a which meshes with and is rotated by the ring-shaped gear 44, and a detector which is rotated by the gear 45a. Which disk holder 41 within the stock unit 3 (i.e., the disk holder 41 of which number in order) has moved to the selection position 41A, and whether or not the selected disk holder 41 has moved to the selection position 41A without mistake, can be detected by detecting the output from the selection detecting unit 45.

A driving unit 50 is provided on the base 2. As shown in FIG. 3, the driving unit 50 includes a drive chassis 51 and a clamp chassis 52. The drive chassis 51 and clamp chassis 52 are assembled in a parallel manner, such that the drive chassis 51 and clamp chassis 52 can move so as to be relatively brought closer to one another or distanced from one another. The drive chassis 51 is positioned below the transport path for the disk D defined by the guide member 11 and the transporting unit 20, and the clamp chassis 52 is positioned above the transport path.

A spindle motor 53 is provided below the drive chassis 51, and a turntable 54 which is rotationally driven by the spindle motor 53 is provided above. With this configuration, the turntable is a rotational driving unit. Also, an optical head 55 is provided below the drive chassis 51. The detecting light for playback or the light for recording that is irradiated from the object lens of the optical head 55 passes through a notch formed in the drive chassis 51 and is irradiated onto the recording surface of the disk D. Also, the optical head 55 is movable over the recording face of the disk D.

A damper 56 is rotationally supported by the clamp chassis 52, and the damper 56 is tensioned downward by a flat spring 57. A clamp driving unit is provided on a moving base (not shown) moving in the Y direction with the driver chassis 51 mounted thereupon, or on the base 2. Driving power from the clamp driving unit is transferred to the drive chassis 51 and the clamp chassis 52, whereby the drive chassis 51 and the clamp chassis 52 are driven in the direction of approaching each other, or in the direction of being distanced from each other. When the drive chassis 51 and the clamp chassis 52 are separated, a gap for the disk D to be transferred through is formed between the turntable 54 and the damper 56. When the drive chassis 51 and the clamp chassis 52 approach one another, the turntable 54 and the damper 56 approach each other, and at that time, the damper 56 is pressed into contact against the turntable 54 with the disk D therebetween, by the force of the flat spring 57.

As shown in FIG. 4, a supporting chassis 65 for supporting the moving base upon which is mounted the driving unit 50 is provided within the casing 10. The drive chassis 51 of the driving unit 50 is supported so as to move in the Y1–Y2 directions over the face of the supporting chassis 65. Also, the driving unit 50 moves in the Y1–Y2 directions over the face of the supporting chassis 65 by the driving force of a motor (not shown).

FIGS. 2 and 4 illustrate the state wherein the driving unit 50 is transferred to the driving position. The disk D is clamped by the driving unit 50 which stops at the driving position shown in FIGS. 2 and 4, and is rotationally driven. Also, when the disk holders 41 in the stock unit 3 are moved vertically to select one of the disks, the driving unit 50 is transferred to the retracted position toward the insertion opening 15 (Y2 side) as indicated by the dotted line, so as not to contact the disk D ascending or descending along with the disk holder thereof.

The supporting chassis 65 is supported by dampers 66 and is hung by a coil spring 67, as shown in FIG. 4. The dampers 66 are arrangements wherein air, a fluid such as oil, or the like, is sealed in a rubber pouch-like structure.

Pins 68 are fixed on the side of the supporting chassis 65. On the other hand, a lock member 69 which can move in the Y1–Y2 direction is provided in the case 10, and the pins 68 are inserted into lock holes 70 formed in the lock member 69. Each lock hole 70 has a lock unit 70a wherein the width thereof is narrower at the Y2 side.

As shown in FIG. 4, in the event that the driving unit 50 moves to the driving position and a disk inserted from the insertion opening 15 is supplied between the turntable 54 and the damper 56, or in the event that a disk D is extracted from a disk holder 41 at the selection position 41A and is supplied between the turntable 54 and the damper 56, the lock member 69 moves in the Y1 direction and the pins 68 are held within the lock units 70a, thus locking the supporting chassis 65.

When the turntable 54 and the damper 56 draw closer to one another so that the center hole of the disk D can be clamped between the turntable 54 and the damper 56, the lock member 69 moves in the Y2 direction at the same time, so that the lock units 70a move away from the pins 68, thereby disengaging the locking state of the supporting chassis. At this time, the supporting chassis 65 and the driving unit 50 are elastically supported within the casing 10 by the dampers 66 and the coil spring 67.

While the setting motor M, for moving the first transfer member 6 and the second transfer member 7 so as to set the spacing Wx therebetween, is driven by a motor driver 63, the motor driver 63 is controlled by a main control unit 61. All other motors in the device are also controlled by the main control unit 61.

The detecting output from the linear position sensor for detecting the shifting position of the second transfer member 7 is supplied to the main control unit 61. Also, the detecting outputs from the first detecting switch 31 and the second detecting switch 32, provided on the guide member 11, are supplied to the main control unit 61. Further, output of the selection detecting unit 45 also is provided to the main control unit 61. Though omitted in the drawings, a holding detection unit for detecting that a disk has been completely held within a disk holder 41 positioned at the selection position 41A is provided in the stock unit 3, and output from this holding detection unit and all other detecting units is provided to the main control unit 61. The main control unit 61 further comprises memory 62 containing various types of programs.

Next, the operation of this disk device will be described.

At the standby position (home position) awaiting reception of a disk, the driving unit 50 has moved to the Y1 side over the supporting chassis 65, such that the driving unit 50 is at a driving position indicated by a single-dot broken line in FIGS. 2 and 4. The drive chassis 51 within the driving unit 50 rises, and the turntable 54 is pressed against the damper 56. Further, the lock member 69 shown in FIG. 4 moves in the Y2 direction, so that the lock units 70a of the lock holes 70 are disengaged from the pins 68 so that locking of the supporting chassis 65 is released. Accordingly, the driving unit 50 supported thereby is elastically supported by the dampers 66 and the coil spring 67.

With an arrangement wherein the supporting chassis 65 is not locked but rather is elastically supported at the home position awaiting reception of a disk, the supporting chassis 65 is not forcibly pressed in the Y1 direction by the lock member 69, and an undue force is not placed on the dampers 66 or the coil spring 67. Also, vehicle vibrations and the like do not act upon the engaged portion between the lock member 69 and the pins 68, thereby avoiding undue force being placed on the lock-engaged portion which would lead to fatigue and damage. Further, destruction of the lock-engaged portion can be prevented even in the event of receiving a major shock at the point of shipping from the factory or during transport.

Further, chattering at the engaged portion between the lock member 69 and pins 68 is not generated by vehicle vibrations and the like, and vibrations transmitted to the mechanism on the supporting chassis 65 and the mechanisms within the driving unit 50 are attenuated by the dampers 66 and the coil spring 67, so chattering of the mechanisms on the supporting chassis 65 or in the driving unit 50 can be suppressed.

In the standby state, a pre-selected disk holder 41 stops at the selection position 41A, and the guide member 11 and the transporting unit 20 are at the same height. Also, the spacing Wx between the guide member 11 and the transporting unit 20 is the widest, even wider than the spacing for nipping a large disk 12 cm in diameter.

At the time of inserting a disk, or pressing a button or the like provided on the face portion, the transporting rollers 21, 22, 23, and 24, of the transporting unit 20 start rotating in the direction whereby a disk can be carried in. Also, the drive chassis 51 is lowered by the clamp driving unit, so that the turntable 54 and the damper 56 are separated, with a gap therebetween into which the disk can be introduced. Further, as shown in FIG. 4, the lock member 69 is moved in the Y1 direction at this time, the pins 68 are held within the lock units 70a of the lock holes, and the supporting chassis 65 is thus locked. Accordingly, the turntable 54 and damper 56 can be prevented from hitting the disk being transported by the transporting unit 20.

Also, pressing the button or the like starts the setting motor M whereby the first transfer member 6 and the second transfer member 7 move so as to approach one another, and the spacing Wx between the guide member 11 and the transporting unit 20 is set to a dimension narrower than that for nipping a small disk 8 cm in diameter.

In the event that a disk is inserted from the insertion opening 15 and the outer edge thereof presses either of the detecting arm 12 or the rotational arm 28 so as to move the arm outward, and one of the insertion detecting switches 14 or 29 turns on, the judgment is made at the main control unit 61 that a disk is inserted.

In the event that the judgment is made that a disk has been inserted, the setting motor M is driven. The first transfer member 6 and the second transfer member 7 begin to move so as to be distanced from each other, the spacing Wx between the guide member 11 and the transporting member 20 is enlarged to the size wherein a small disk of 8 cm in diameter can be nipped so as to be transported, and the spacing between the first transfer member 6 and the second transfer member 7 is fixed at this position. Setting of the above spacing Wx is controlled by the linear position sensor detecting the shift position of the second transfer member 7.

The spacing Wx which is to be set at this time is that for a small disk of 8 cm in diameter, since only one of the detecting arm 12 and the rotational arm 28 is pressed so as to move outward, and accordingly just one of the two insertion detecting switches 14 and 29 turns on, but both of those are not turned on simultaneously by the small disk. Accordingly, unless both of the insertion detecting switches 14 and 29 turn on simultaneously, the main control unit 61 judges that the inserted disk is a small disk, and the spacing Wx between the guide member 11 and the transporting member 20 remains set to the position wherein a small disk of 8 cm in diameter can be nipped and transported.

The small disk is carried in by the clockwise rotation of the transporting rollers 21, 22, 23, and 24, of the transporting unit 20, and the disk is transferred in the Y1 direction by rolling along and within the guide groove 11a of the guide member 11.

In the event that a small disk is inserted, the disk is not carried in to the position of being held by a disk holder of the stock unit 3, but rather is transported to a position where it can be driven by the driving unit 50 stopped at the driving position indicated by the single-dot broken line shown in FIGS. 2 and 4. The fact that a small disk has been transported to a position where it can be driven by the driving unit 50 is detected by monitoring the first detecting switch 31 and the second detecting switch 32.

An activator 31a of the first detecting switch 31 and an activator 32a of the second detecting switch 32 are positioned with a spacing therebetween in the transport direction of the disk. This spacing is such that the activators 31a and 32a are both pressed by the outer edge of a small disk Ds when the center hole of the small disk Ds and the center of the turntable 54 are aligned.

Accordingly, when both the activator 31a of the first detecting switch 31 and the activator 32a of the second detecting switch 32 are pressed by the outer edge of a small disk Ds such that both the first detecting switch 31 and the second detecting switch 32 turn on, the main control unit 61 judges that the center of the small disk has matched the center of the turntable 54, and executes control for stopping the driving of the transporting unit 20.

Subsequently, the drive chassis 51 ascends within the driving unit 50, the center hole of the small disk is fit to a positioning protrusion 54a of the turntable 54, and the small disk is nipped between the turntable 54 and damper 56, and clamped. At this time, the lock member 39 shown in FIG. 4 is transferred in the Y2 direction, the locking of the supporting chassis 65 is disengaged, and the supporting chassis 65 is elastically supported. Also, the first transfer member 6 and the second transfer member 7 move away from each other, so the spacing Wx between the guide member 11 and the transporting member 20 is set to the widest dimension, the same as at the home position.

The small disk Ds is rotationally driven by the rotating force of the spindle motor 53, and a playback or a recording operation is preformed by the optical head 55.

The small disk which has finished playback or recording is nipped between the guide member 11 and the transporting member 20 and is carried out in the Y2 direction toward the insertion opening provided in the face portion. At this time, the outputs of the insertion detecting switches 14 and 29 are monitored by the main control unit 61, and upon one of the insertion detecting switches turning on and then turning off, the transporting rollers are stopped and the disk is stopped with a portion of the disk protruding from the insertion opening. The operation at this time is controlled according to the flowchart shown in FIG. 6, which will be described later.

Next, the control operation in the event of a large disk D with a diameter of 12 cm being inserted will be described. At the home position with no disk inserted, the spacing Wx between the guide member 11 and the transporting unit 20 is set to the widest, even wider than the spacing for nipping a large disk D, as described earlier. Upon pressing a button or the like, the supporting chassis 65 is locked and the turntable 54 and the damper 56 are separated, as with a small disk. The rotation of the rollers of the transporting unit 20 starts, and the spacing Wx between the guide member 11 and the transporting unit 20 is first set to a dimension narrower than that for nipping a small disk 8 cm in diameter.

In the event that a large disk is inserted from the insertion opening 15 and the outer edge thereof presses either of the detecting arm 12 or the rotational arm 28 so as to move outward, and one of the insertion detecting switches 14 or 29 turns on, the judgment is made by the main control unit 61 that a disk has been inserted. The setting motor M is then driven, and the first transfer member 6 and the second transfer member 7 begin to move so as to be distanced from each other, with the spacing Wx enlarged to the size wherein a small disk of 8 cm in diameter can be transported.

In the event that the inserted disk is a large disk, the outer edge thereof presses both the detecting arm 12 and the rotational arm 28 so as to move outward immediately following the disk being taken in by the transporting rollers of the transporting unit 20, and both of the insertion detecting switches 14 or 29 turn on. At this point, the judgment is made by the main control unit 61 that a large disk has been inserted.

Immediately following this, the setting motor M is driven again, and the spacing Wx between the guide member 11 and the transporting unit 20 is enlarged to the size wherein a large disk can be transported. Setting of this spacing Wx is controlled by monitoring the linear position sensor. The large disk is then carried in the Y1 direction by the clockwise rotation of the transporting rollers 21, 22, 23, and 24 of the transporting unit 20.

The spacing between the activators 31a and 32a of the first detecting switch 31 and the second detecting switch 32 is such that the first detecting switch 31 and the second detecting switch 32 both turn on in the event that the center hole of the large disk 12 cm in diameter matches the center of the turntable 54, as shown in FIG. 5.

The control operation for clamping the large disk D to the turntable 54 in a reliable manner involves, as illustrated in FIG. 5, the large disk D being transported in the Y1 direction whereby the first detecting switch 31 first turns on. The center hole D1 of the large disk D is situated to the Y2 side of the center of the turntable 54 by a minute distance δ. Upon the first detecting switch 31 turning on, control is performed for making a transition to the clamping operation, and the drive chassis ascends. Note however that at this point, the supporting chassis 65 remains locked by the locking member 69. Upon the drive chassis 51 ascending, the upper face of the positioning protrusion 54a of the turntable 54 is pressed against the disk D at a position minutely offset from the center hole D1.

The disk D is further sent in the Y1 direction, and upon the center of the disk being aligned with the center of the turntable 54, the center hole D1 of the disk is forcibly fit to the positioning protrusion 54a of the turntable 54. At this time, the activator 32a of the second detecting switch 32 is pressed by the outer edge of the disk D, and both detecting switches 31 and 32 are on together. At the point that both detecting switches 31 and 32 turn on the judgment is made that the center hole of the large disk D has fit securely to the positioning protrusion 54a of the turntable 54, and that the disk D has been clamped between the turntable 54 and the damper 56.

Following this judgment, the lock member 69 shown in FIG. 4 moves in the Y2 direction, the lock units 70a of the lock holes 70 are removed from the pins 68, and the supporting chassis 65 is elastically supported by the dampers 66 and the coil spring 67.

Then, the spindle motor starts, and a playback or a recording operation is performed by the optical head 55. Prior to starting the spindle motor 53, the first transfer member 6 and second transfer member 7 are driven so as to be distanced one from another, the spacing Wx between the guide member 11 and the transporting unit 20 is expanded, and the guide member 11 and the transporting unit 20 withdraw from the outer edge of the large disk 12 cm in diameter.

The large disk which has finished playback or recording may be either discharged to the insertion opening, or may be sent into the stock unit 3 and held in one of the disk holders 41.

The operation control carried out when the above-described discharging process is conducted will now be described with reference to the flowchart shown in FIG. 6. In the flowcharts, process steps are indicated by "ST". Note that the flowchart shown in FIG. 6 is the same for cases wherein small disks 8 cm in diameter are discharged, as well.

Figure 6:
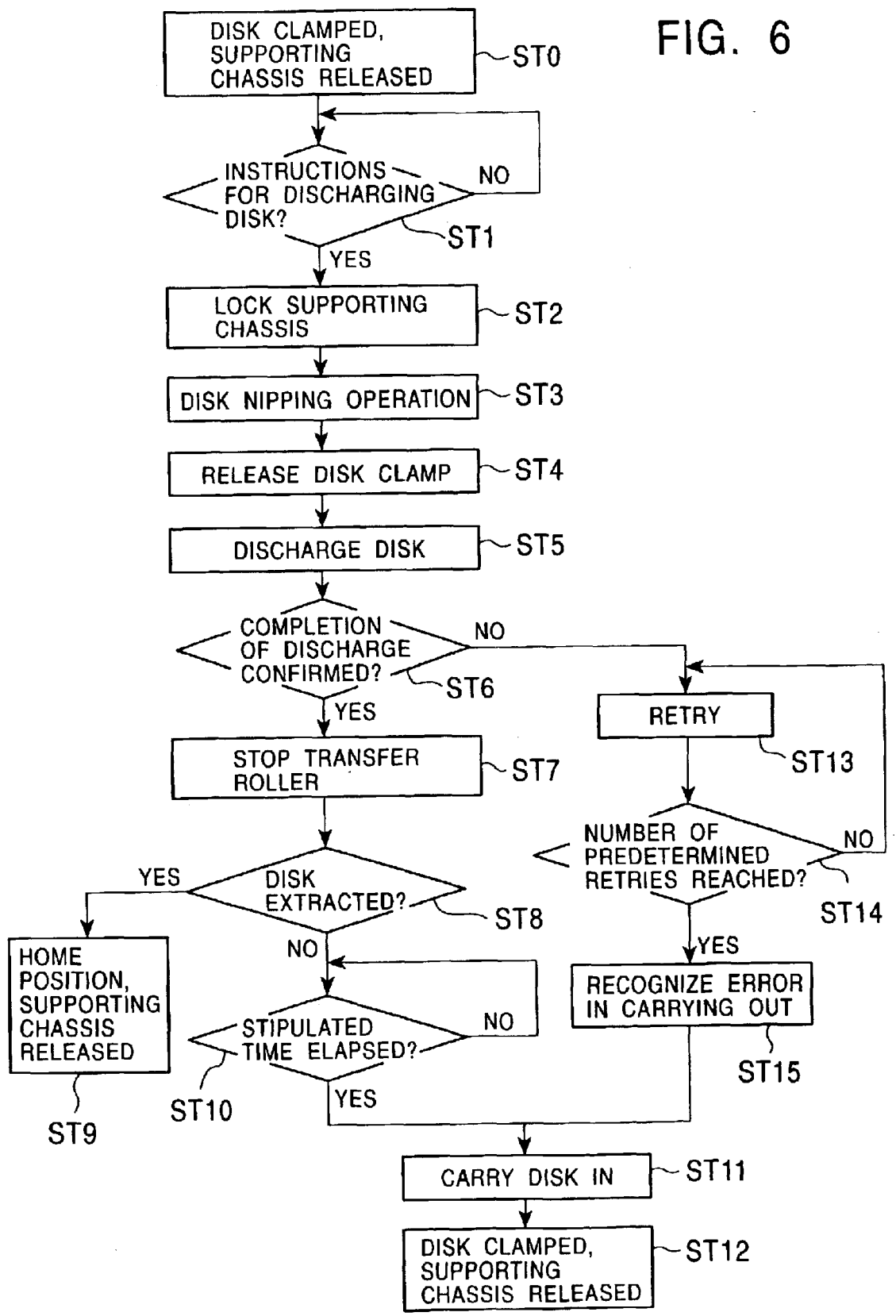
FIG. 6 is a flowchart of control operations for discharging the disk from the rotational driving unit.

In ST0 in FIG. 6, the center of the disk is clamped by the turntable 54, and the supporting chassis 65 is in a lock-disengaged state wherein the supporting chassis 65 is not locked by the lock member 69.

Upon confirmation of a disk discharging operation being made in ST1, in ST2 the lock member 69 is driven in the Y1 direction, so that the pins 68 are held by the lock units 70a and the supporting chassis 65 is locked.

In ST3, the setting motor M is run so that the first transfer member 6 and second transfer member 7 approach one another, thereby narrowing the spacing Wx between the guide member 11 and the transporting unit 20, and the large disk D is nipped between the guide member 11 and the transporting unit 20. When one of the first detecting switch 31 and the second detecting switch 32 provided on the guide member 11 turns on, the judgment is made that the disk nipping operation has been completed.

Next, in ST4, the drive chassis 51 of the driving unit 50 is lowered, and the turntable 54 and damper 56 are separated from the disk, so that clamping of the disk is disengaged. Note however, that at this point, the lock member 69 has moved in the Y1 direction as described above, so the supporting chassis 65 remains locked by the lock member 69.

In ST5, the transporting rollers 21, 22, 23, and 24 are driven in the counter-clockwise direction and the disk is transported out toward the insertion opening 15. In ST6, the insertion detecting switches 14 and 29 are monitored, and the judgment is made regarding whether or not the disk has been discharged to a position protruding from the insertion opening 15. Here, regardless of whether the disk to be discharged is large or small, the judgment is made that the disk discharging operation has been completed upon at least one insertion detecting switch turning on and then off. Upon detection of completion of the discharging operation, the transporting rollers 21, 22, 23, and 24 are stopped in ST7, and the disk stops at a position partially protruding from the insertion opening.

Subsequently, in ST8, whether or not the disk is extracted from the insertion opening 15 is monitored. At this time, the insertion detecting switches 14 and 29 are monitored, and the judgment is made that the disk D has been extracted upon both insertion detecting switches turning off. Or, if a door is provided to the insertion opening 15, whether or not the disk has been extracted can be detected by detecting whether or not the door has been closed.

Upon judging that the disk has been extracted, the flow proceeds to ST9, to return to the home position. As described above, at this home position, the turntable 54 and damper 56 are pressed together within the driving unit 50 positioned as shown in FIGS. 2 and 4, with the lock member 69 shown in FIG. 4 having moved in the Y2 direction so that the locking of the supporting chassis 65 by the lock member 69 is disengaged. The spacing Wx between the guide member 11 and the transporting unit 20 is set to a spacing wider than the spacing for nipping a large disk.

In the event that extraction of the disk is not detected in ST8, the flow proceeds to ST10, and measures whether or not a stipulated amount of time has elapsed. If the stipulated amount of time elapses without the disk being extracted, the flow proceeds to ST11 where the transporting rollers 21, 22, 23, and 24 of the transporting unit 20 operate in the direction of carrying in the disk, so that the disk is taken in toward the driving unit 50. In ST12, the disk is nipped between the turntable 54 and the damper 56, so as to be clamped. The action of positioning the disk on the turntable 54 and clamping the disk is the same as the clamping action upon the disk being inserted from the insertion opening. Further, the locking of the supporting chassis 65 is disengaged, so that the supporting chassis 65 is in an elastically supported state. Also, the spacing Wx between the guide member 11 and the transporting unit 20 is enlarged, and the guide member 11 and the transporting unit 20 are moved to positions away from the large disk.

In this way, if the disk protrudes from the insertion opening 15 for a long period of time, the disk is taken in and clamped by the driving unit, but the device stops in the same state as the home position wherein the supporting chassis 65 is elastically supported. Accordingly, conditions can be prevented wherein undue force is applied on the locked portions of the lock member 69 and pins 68, or wherein chattering noise occurs.

Next, in ST6, if the result of monitoring the insertion detecting switches 14 and 29 during the disk discharging operation shows that neither insertion detecting switch turns on within a predetermined amount of time from the start of the discharging operation, the flow proceeds to ST13 and a retry is executed. This retry is performed by running the transporting rollers 21, 22, 23, and 24 of the transporting unit 20 in the direction for carrying the disk in for a predetermined amount of time, thereby providing the disk with a driving force in the Y1 direction, and subsequently reverting the transporting rollers 21, 22, 23, and 24 so as to provide a driving force to the disk toward the discharging direction.

If the judgment is made in ST14 that the number of retries has exceeded a predetermined number, the judgment is made in ST15 that a problem has occurred in the disk guiding and transporting system, and that the disk transporting error cannot be corrected. In this case, the disk device has malfunctioned and must be repaired, so the flow goes to ST11 and runs the transporting rollers 21, 22, 23, and 24, of the transporting unit 20 in the direction for carrying the disk in, thereby taking the disk into the device. In ST12, the disk is clamped by the turntable 54 and the damper 56, the spacing Wx between the guide member 11 and the transporting unit 20 is enlarged, and the guide member 11 and the transporting unit 20 are moved to positions away from the disk. Further, the lock member 69 is operated to release the locking of the supporting chassis 65. All operations are then terminated with no further operations being accepted, and a display is made on the display portion of the face to the effect that an error has occurred.

Accordingly, the disk is clamped by the driving unit and the supporting chassis 65 is elastically supported until the malfunction is corrected by repairing or the like, so undue force is not applied to the lock engaging portion and chattering can be prevented. Further, the device stops in the state of the disk having been clamped to the turntable 54, so undue force being applied to the disk or the disk being damaged during repair can be prevented.

As described above, there is a better chance that the disk can be discharged by retrying. That is to say, sending the disk into the device in ST11 increases the probability that the disk can be returned to the initial state in ST12 wherein the center hole D1 of the disk is clamped to the turntable 54. However, there can be cases wherein the flow proceeds to ST11 due to an error recognition following the retry, and the monitoring results of the first detecting switch 31 and second detecting switch 32 shows that the disk was not reliably clamped to the turntable 54 within a predetermined amount of time upon carrying the disk in at ST11. In such a case, the transporting unit 20 is stopped, carrying in of the disk is terminated, and the operation is terminated in an error state.

Next, the operation will be described for sending a large disk D to the stock unit 3 following completion of a recording or a playback operation on the disk with the driving unit 50.

Figure 7:
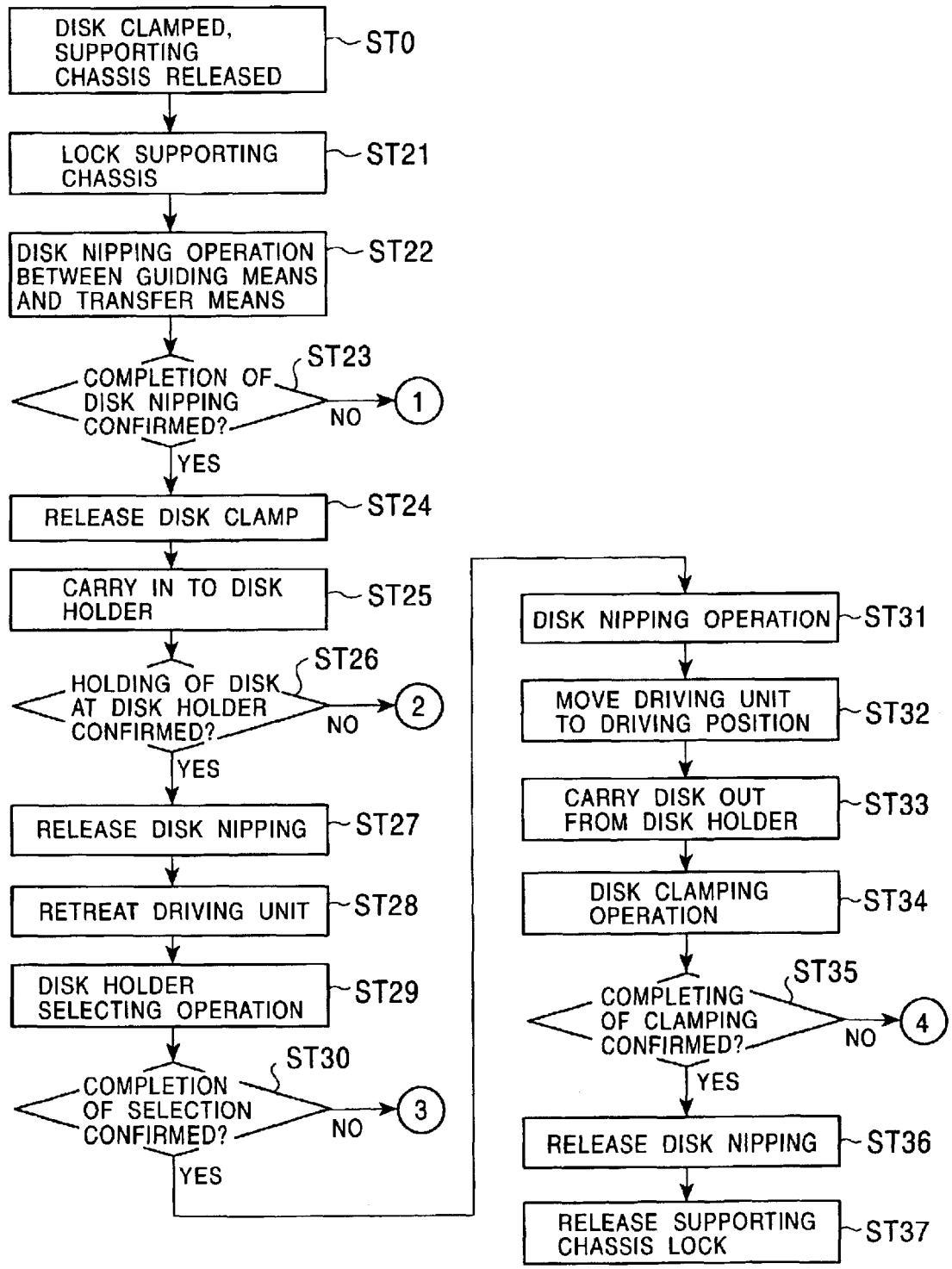
FIG. 7 is a flowchart of control operations for transferring the disk from the rotational driving unit to the stock unit.

The control operation made at this time will be described with reference to the flowchart in FIG. 7. ST0 in FIG. 7 is the same as ST0 in FIG. 6, which is a state wherein the center of the disk is clamped to the turntable 54 and the supporting chassis 65 is not locked by the lock member 69.

When sending the disk to a disk holder 41 stationed at the selection position 41A, first, in ST21, the lock member 69 is driven in the Y1 direction, and the pins 68 are held by the lock units 70a so that the supporting chassis 65 is locked. Next, in ST22, the setting motor M runs so that the first transfer member 6 and the second transfer member 7 approach one another, so the spacing Wx between the guide member 11 and the transporting unit 20 is reduced, and the large disk D is nipped between the guide member 11 and the transporting unit 20.

In ST23, the first detecting switch 31 and second detecting switch 32 provided on the guide member 11 are monitored, and one of the detecting switches turning on confirms that the disk nipping operation has been completed. If neither of the detecting switches turned on in ST23 within the predetermined time, the flow proceeds to error processing operation ①.

In ST23, upon confirmation that the disk is nipped on the turntable 54 between the guide member 11 and the transporting unit 20, in ST24 the drive chassis 51 of the driving unit 50 is lowered so that the turntable 54 and the damper 56 are separated from the disk, and the clamping of the disk is disengaged. Note however, that the lock member 69 is moving in the Y1 direction as described above, and the supporting chassis 65 is stilled locked by the lock member 69.

In ST25, the transporting unit 20 starts moving in the transport direction, and the disk is carried toward the disk holder 41 which is at the selection position 41A at the same height as the guide member 11 and the transporting unit 20. In ST26, the output of the holding detection unit is confirmed, and whether or not the disk is held by the disk holder 41 at the selection position 41A in a reliable manner is confirmed. In the event that this confirmation cannot be made within a predetermined amount of time that the disk has been held by the disk holder 41 in ST26, the flow proceeds to error processing operation ②.

If confirmation is made that the disk is held by the disk holder 41 in a reliable manner, the flow proceeds to ST27.

Here, the first transfer member 6 and the second transfer member 7 move away one from another, the spacing Wx between the guide member 11 and the transporting unit 20 is enlarged, and the guide member 11 and the transporting unit 20 move to a position so as to not contact the disk held in the disk holder 41.

Next, the control operation for selecting and driving one of the disks within the stock unit 3 will be described.

When an operating button provided on the face portion is pressed to specify one of the disk holders 41 within the stock unit 3 by number or the like, the flow proceeds to ST28 in FIG. 7. Under the control of the main control unit 61, the driving unit 50 moves to the insertion opening side (the Y2 side) as indicated by the dotted line in FIG. 4, and the driving unit 50 is retracted to a position so as to not contact the disk held in the disk holder 41.

Next, in the disk holder selection operation of ST29, a ring-shaped gear 44 of the stock unit 3 is driven and the guide shafts 42 are rotated, thereby vertically moving the disk holder 41 by screw grooves 42a. In ST30, the output of the selection detecting unit 45 shown in FIG. 1 is monitored to determine whether or not the selected disk holder 41 has been moved to the selection position 41A. If the judgment cannot be made in ST30 within a certain amount of time that the specified disk holder 41 has been moved to the selection position 41A, the flow proceeds to error processing operation ③.

If the judgment is made in ST30 that the selected disk holder 41 has reached the selection position 41A within the predetermined amount of time, the ring-shaped gear 44 is stopped and the guide shafts 42 are stopped, whereupon the selection operation ends.

Subsequently, in ST31, the spacing Wx between the guide member 11 and the transporting unit 20 is reduced, and the disk D held by the disk holder 41 is nipped between the guide member 11 and the transporting unit 20. Also, in ST32, the driving unit 50 which had been retracted until now is moved in the Y1 direction, reaches the driving position indicated by dotted lines in FIGS. 2 and 4, and stops.

In ST33, the transporting rollers 21, 22, 23, and 24 start running in the counter-clockwise direction, so that the disk is extracted from the disk holder in the Y2 direction. At this time, in ST34, the same disk clamping operations are performed as those performed upon a large disk being inserted from the insertion opening 15. In ST35, monitoring is performed at this time regarding whether or not the first detecting switch 31 and second detecting switch 32 both turn on so that completion of the clamping of the disk onto the turntable 54 can be confirmed. In the event that clamping of the disk onto the turntable 54 cannot be confirmed, the flow proceeds to error processing operation ④.

If clamping of the large disk onto the turntable 54 is confirmed in ST35, the guide member 11 and the transporting unit 20 are separated from the disk in ST36. Then, in ST37, the lock member 69 operates to release the locking of the supporting chassis 65, thereby enabling rotational driving of the disk. Also, the guide member 11 and the transporting unit 20 move to positions away from the disk.

Next, the error processing operations ①, ②, ③, and ④ will be described with reference to the flowcharts shown in FIGS. 8 through 11.

Figure 8:
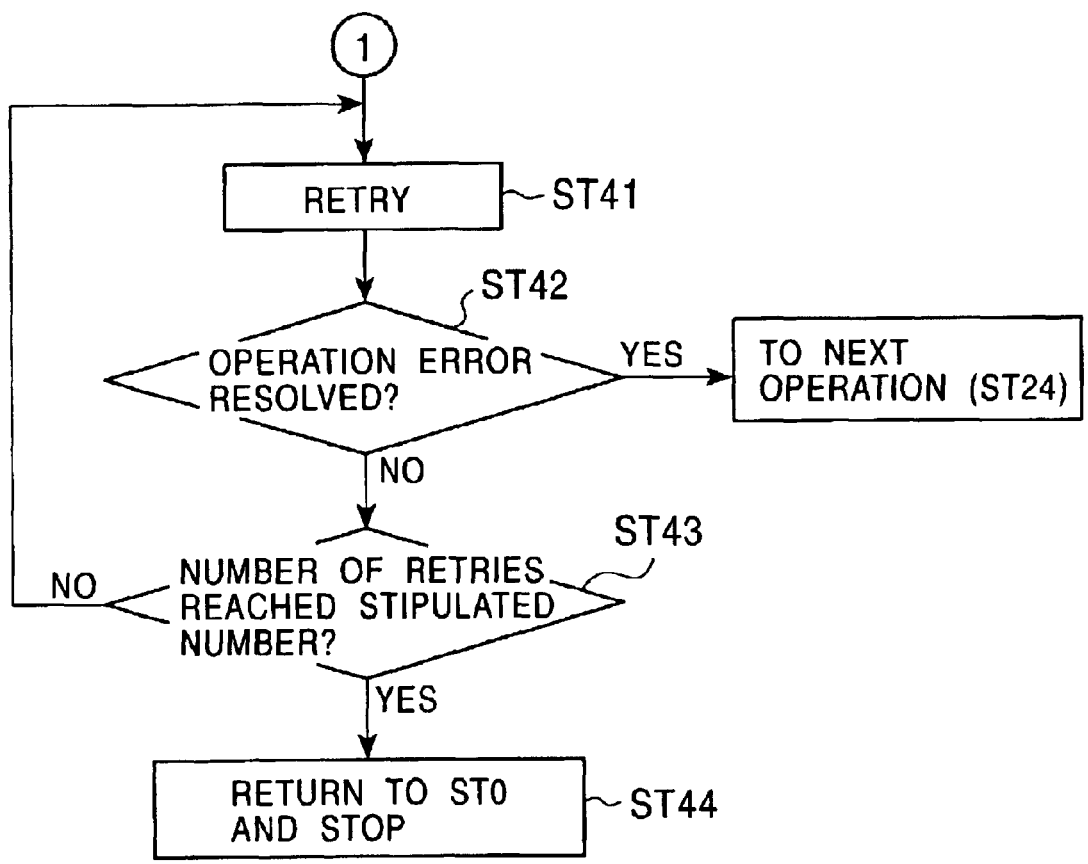
FIG. 8 is a flowchart of an error processing operation.

FIG. 8 illustrates the error processing operation ① for the case wherein an error has occurred in ST23 in the operation for nipping a large disk on the turntable 54 with the guide member 11 and the transporting unit 20.

With this error processing operation, a retry is performed in ST41. This retry is performed by increasing the spacing between the guide member 11 and the transporting unit 20, then bringing the guide member 11 and the transporting unit 20 together again while confirming the operation of the first detecting switch 31 and the second detecting switch 32 in ST42. Also, an arrangement may be made for this retry wherein the operation is performed in reverse back up to ST0, i.e., reversed to the state wherein the disk is clamped on the turntable 54 and the locking of the supporting chassis 65 is released, to start the operation from that initial state. Thus, returning the state to ST0 and restarting the operation allows any cause of the error occurring somewhere between ST0 to ST23 to be dealt with more readily.

In the event that the retry results in confirmation of one of the detecting switches 31 and 32 being on in ST42, the judgment is made that completion of the disk nipping operation has been confirmed, and the flow proceeds to the next operation step in ST24.

If the operation error is not resolved in ST42, a calculation is made in ST43 regarding whether or not the number of stipulated retries has been made, and if the judgment is made that the number of retries has exceeded the predetermined number, the flow proceeds to ST44. In ST44, the flow returns to ST21, further reverses the flow to ST0 which is the initial state, and stops the operation in the ST0 state, i.e., the state wherein the disk is clamped on the turntable 54 and the lock member 69 moves in the Y2 direction such that locking of the supporting chassis 65 is released. A display is then made on the display portion of the face portion to the effect that an error has occurred.

Figure 9:
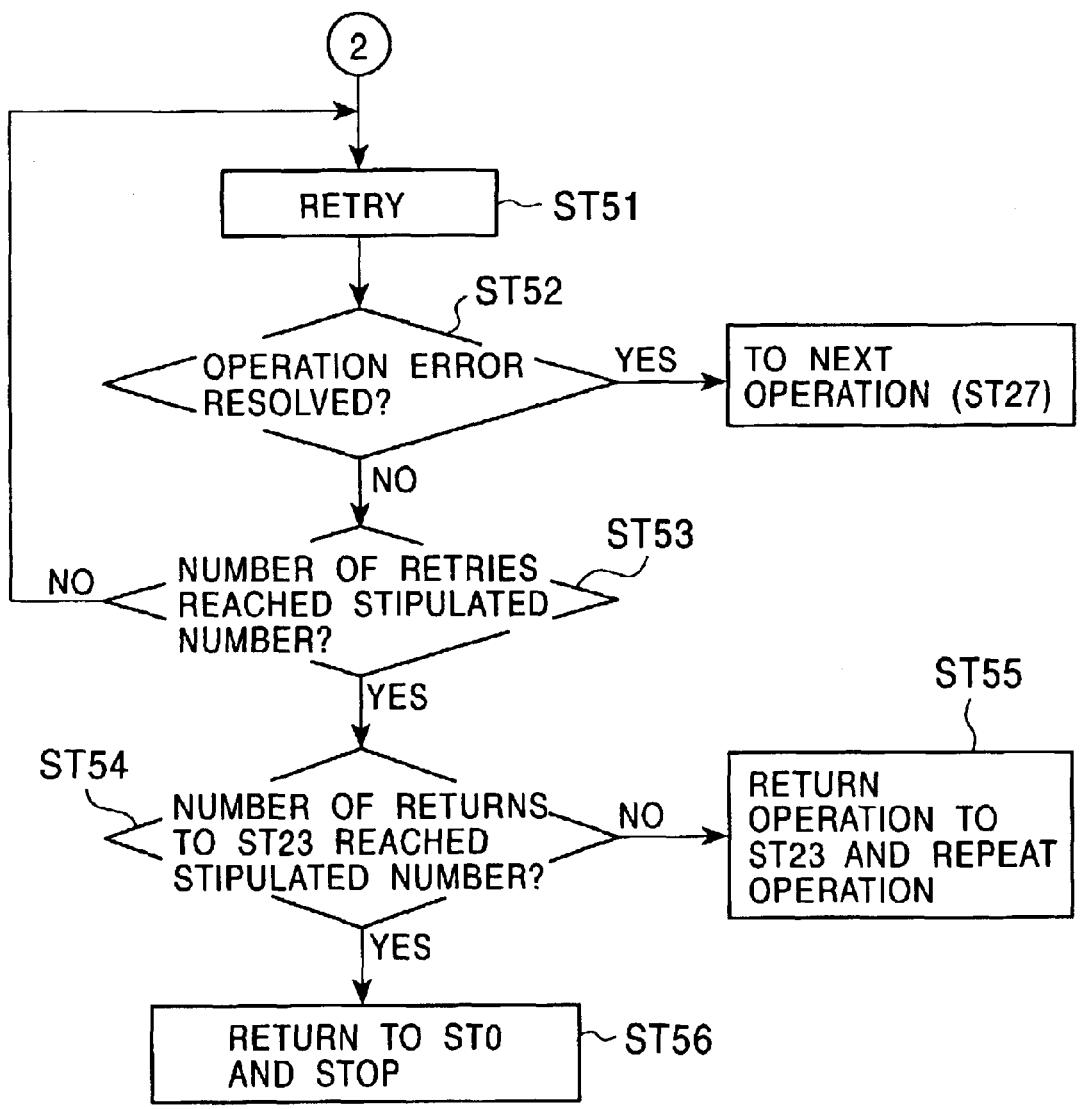
FIG. 9 is a flowchart of an error processing operation.

FIG. 9 illustrates the error processing operation ② for the case wherein confirmation could not be made in a predetermined amount of time in ST26 that the disk carried into the stock unit 3 was held by the disk holder 41 at the selection position 41A.

With this error processing operation, first, in ST51, a retry is attempted at the current stage. This retry is performed by running the transporting rollers of the transporting unit 20 in the discharging direction to as to provide the disk with a transport force in the Y2 direction, following which the transporting rollers are run in the carrying direction, thereby moving the disk D to the disk holder 41 again.

If confirmation is made in ST52 that holding of the disk by the disk holder 41 has been completed within the predetermined amount of time by this retry, the flow proceeds to the subsequent operation in step ST27.

If the judgment is made in ST52 that the retry did not resolve the error, whether or not the number of retries has reached the stipulated number is calculated in ST53, and if the number of retries has exceeded the stipulated number, the flow proceeds to ST54 and ST55.

Here, in ST55, the operation is reversed from ST26 which is the current step. That is, the transporting rollers of the transporting unit 20 are run in the discharging direction so as to move the center hole D1 of the disk toward the turntable 54, and at the point that the second detecting switch 32 turns on, the disk is nipped between the turntable 54 and the damper 56. This clamping confirmation operation is the same as the above-described ST35, and the state of the disk clamped between the turntable 54 and the damper 56 can be confirmed by sending the disk in the Y2 direction and detecting that the first detecting switch 31 and the second detecting switch 32 turn on.

This reversal of operation returns the flow to the previous step ST23, so confirmation can be made that the disk is on the turntable 54 by the first detecting switch 31 and the second detecting switch 32 provided on the guide member 11.

After returning the flow to the previous step ST23, the flow resumes forward progress from ST23 to ST24 and ST25. In the event that an operation error has occurred in ST26, the cause thereof lies in one of the steps between the previous steps ST23 to ST26, since it has been confirmed that the operation has been normal up to immediately before ST23. Accordingly, returning the operation to the previous step ST23 and then resuming the operation raises the probability that the error will be resolved at a point leading up to ST26.

In ST54 of FIG. 9, a calculation is made regarding how many times the flow has been returned to the previous step ST23 and resumed from there, and if this has been performed a predetermined number of times with no confirmation of completion of the operation in ST26, the judgment is made that the error cannot be resolved by returning the flow to ST23 and restarting the operation. At this point, the flow proceeds to ST56, and returns the operation to the initial ST0. That is, the guide member 11 and the transporting unit 20 are separated from the disk on the turntable 54, and, with the disk clamped on the turntable 54, the locking of the supporting chassis 65 by the lock member 69 is released.

The device is stopped in a state with no further operations being accepted, and a display is made on the display portion to the effect that an error has occurred.

The device awaits repair in this state, wherein the supporting chassis 65 is elastically supported by the dampers 66 and the coil spring 67, and the lock member 69 and the pins 68 are not engaged, so undue force is not applied to the lock-engaged portion between the lock member 69 and pins 68. Also, the disk is clamped to the turntable 54, which facilitates removal of the disk at the time of repair, with less chance of damage thereto.

An arrangement may be made wherein, in the event that the confirmation error in ST26 cannot be resolved within the predetermined number of retries in ST53, and the flow is returned to the initial state in ST0 to be restarted therefrom and this also is performed the predetermined number of times without successfully resolving the error, the flow returns to ST0 and terminates operation as an error in the state wherein the disk is clamped and the supporting chassis 65 is elastically supported.

Also, an arrangement may be made in ST44 in FIG. 8 and in ST56 in FIG. 9 wherein the operation is terminated and an error display is made in the state of the flow being returned to ST22, i.e., the state wherein the disk is clamped to the turntable 54 and the disk is nipped between the guide member 11 and the transporting unit 20. In this case as well, the device can be transported to repair with the disk being clamped to the turntable 54, thus facilitating removal of the disk with less chance of damage thereto.

Figure 10:
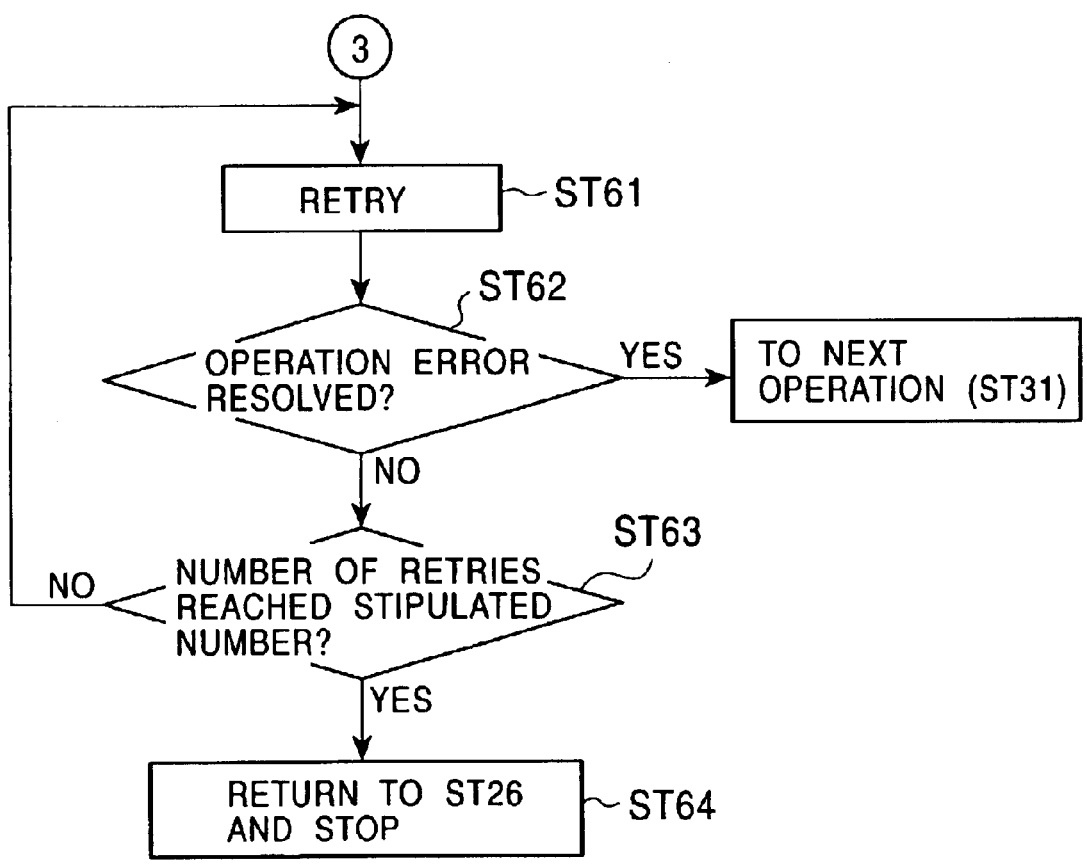
FIG. 10 is a flowchart of an error processing operation.

Next, FIG. 10 illustrates the error processing operation ③ for the case wherein the selection operation of the disk holder 41 is not completed within the predetermined time in ST30.

With this error processing operation, retrying is performed in ST61. This retry involves reverse driving of the ring-shaped gear 44 shown in FIG. 1, reverse driving of the guide shafts 42, reversing the transport direction of the disk holder 41, and subsequently rotating the ring-shaped gear 44 in the direction whereby the selected disk holder 41 moves to the selection position 41A. Also, when performing this retry, the operation is preferably returned to ST26 at the time of reversal rotating the ring-shaped gear 44, i.e., returning the flow to the state before performing the selection operation, and then resuming operation from ST26. Returning the operation to ST26 and then resuming the operation from that point increases the probability that the cause of an error existing in the process between ST26 to ST30 can be resolved.

In the event that the error is resolved by this retry in ST62, the flow proceeds to ST31 which is the next operation.

If the error is not resolved in ST62, whether or not the number of retries has reached the stipulated number of times is calculated in ST63, and if the number of retries has exceeded the stipulated number, the judgment is made that the process flow is incapable of proceeding to ST30. At this time, the operation is reversed to return the flow to step ST26 before disk selection. The operation is stopped in a state with no further operations being accepted, and a display is made on the display portion to the effect that an error has occurred.

The device awaits repair in this state, wherein the operation has been stopped with the disk held in the stock unit 3, which facilitates removal of the disk with less chance of damage thereto during repairs.

Figure 11:
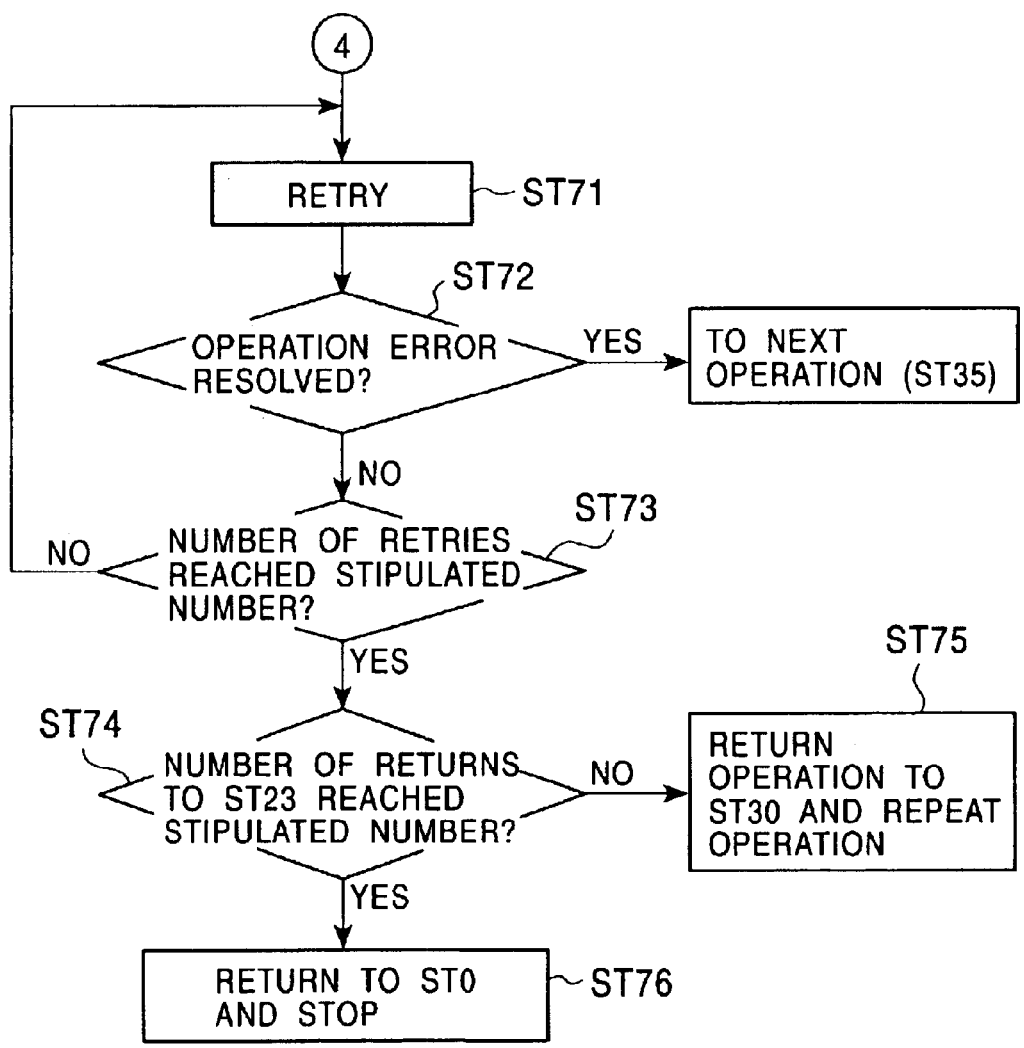
FIG. 11 is a flowchart of an error processing operation.

Next, FIG. 11 illustrates the error processing operation ④ for the case wherein confirmation of clamping onto the turntable 54 could not be made for the disk extracted from the disk holder 41 in ST35.

The retry in ST51 of this error processing operation is performed by provided a transport force to the disk toward the stock unit 3 by reversing the transporting rollers of the transporting unit 20 if the disk extracted from the disk holder 41 cannot be clamped on the turntable 54, and subsequently further reversing the rotation of the transporting unit 20 so as to transport the disk toward the driving unit 50. If confirmation is made in ST72 that the error has been resolved, the flow proceeds to the subsequent operation in ST36.

In the event that the operation error is not resolved in the retry processing, the judgment is made in ST73 regarding whether or not the number of retries has exceeded the stipulated number, and if the number of retries has exceeded the stipulated number, the flow proceeds to ST74 and ST75. In ST75, the operation is reversed from the current step which is ST35, and returned to the previous step ST30, since operation confirmations have been made regarding the steps preceding ST30. ST30 is a state wherein the selection operation of the disk holder 41 has been completed and confirmed. Restarting the operation from ST30 increases the probability that any cause of the error existing in the process between ST30 to ST35 can be resolved.

Also, the judgment is mage in ST74 regarding whether or not the number of operation restarts back from ST30 have reached the predetermined number, and if this has exceeded the predetermined number, the judgment is made that the error cannot be resolved by returning the flow to ST30 and restarting the operation.

In this case, the flow proceeds to ST76, returns the operation to ST26 and stops with no further operations being accepted, and a display is made on the display portion to the effect that an error has occurred.

Consequently, the disk is stored in the stock unit 3 until repair, and the disk can be extracted at the time of repair without damaging the disk.

Note that arrangements may be made wherein, in ST76, the flow is returned to any one of the steps ST30, ST28, or ST27, following which the operation is stopped and placed in an error state. In this case as well, the device can be placed in an operation-terminated state with the disk held in the stock unit 3.

Also, an arrangement may be made wherein, in ST75, instead of returning the operation to ST30, the operation is returned all the way to ST26 and then restarted, to be repeated a predetermined number of times. Also, if nipping of the disk can be confirmed in ST31, the operation may be returned to ST31 in ST75 and then restarted, and if this does not resolve the error, the operation may be returned to ST31 and terminated.

What is claimed is:

1. A disk device comprising:
    a driving unit having
        a rotational driving unit for clamping a disk thereon, said rotational driving unit comprising a turntable, and
        a head facing the disk;
    an elastic supporting member for supporting said driving unit within a casing;
    a locking member for releasably locking said driving unit within the casing; and
    a transfer unit for transferring a disk between an insertion opening and said rotational driving unit;
    wherein, in a standby state with no disk inserted from said insertion opening, said locking member is in the unlocked state, with said driving unit being elastically supported by said elastic supporting member.

2. A disk device according to claim 1, further comprising a control unit which operates said locking member to place said driving unit in a locked state when a disk is inserted from said insertion opening.

3. A disk device according to claim 1, further comprising a control unit for, when an operation error occurs during an operation of discharging a disk clamped by said rotational driving unit to said insertion opening, returning the disk to said rotational driving unit with said transfer unit so as to be clamped, and stopping the operation with the locking state of said locking member released.

4. A disk device according to claim 3, wherein, if disk clamping is not detected within a predetermined amount of time after the disk is returned to said rotational driving unit with said transfer unit so as to be clamped, said control unit stops the disk transfer operation being performed by said transfer unit.

5. A disk device according to claim 2, further comprising a control unit for, when an operation error occurs during an operation of discharging a disk clamped by said rotational driving unit to said insertion opening, returning the disk to said rotational driving unit with said transfer unit so as to be clamped, and stopping the operation with the locking state of said locking member released.

6. A disk device according to claim 5, wherein, if disk clamping is not detected within a predetermined amount of time after the disk is returned to said rotational driving unit with said transfer unit, said control unit stops the transfer operation being performed by said transfer unit.

7. A disk device according to claim 1, further comprising a control unit wherein, when a disk clamped by said rotational driving unit is discharged to said insertion opening and said transfer unit is stopped with the disk protruding from said insertion opening, but the disk is not extracted from said insertion opening within a predetermined amount of time, the disk is returned to said rotational driving unit by said transfer unit and clamped, and the operation is stopped with the locking state of said locking member released.

8. A disk device according to claim 2, further comprising a control unit wherein, when a disk clamped by said rotational driving unit is discharged to said insertion opening and said transfer unit is stopped with the disk protruding from said insertion opening, but the disk is not extracted from said insertion opening within a predetermined amount of time, the disk is returned to said rotational driving unit by said transfer unit and clamped, and the operation is stopped with the locking state of said locking member released.

9. A disk device according to claim 5, wherein said transfer unit comprises a member for nipping the outer edge of the disk so as to provide a transfer force to the disk, thereby transferring the disk between said insertion opening and said rotational driving unit.

10. A disk device according to claim 7, wherein said transfer unit comprises a member for nipping the outer edge of the disk so as to provide a transfer force to the disk, thereby transferring the disk between said insertion opening and said rotational driving unit.

11. A disk device comprising:
  a driving unit having a rotational driving unit for clamping a disk;
  an elastic supporting member for supporting said driving unit within a casing;
  a locking member for releasably locking said driving unit within the casing;
  a stock unit capable of storing a plurality of disks;
  a transfer unit for transferring a disk between said stock unit and said rotational driving unit; and
  a control unit for, when an operation error occurs during an operation of supplying a disk clamped by said rotational driving unit to said stock unit, returning the disk to said rotational driving unit with said transfer unit so as to be clamped, and stopping the operation with the locking state of said locking member released.

12. A disk device according to claim 11, wherein said transfer unit comprises a member for nipping the outer edge of the disk so as to provide a transfer force to the disk, thereby transferring the disk between said stock unit and said rotational driving unit.

13. A disk device according to claim 11, wherein, if disk clamping is not detected within a predetermined amount of time after returning the disk to said rotational driving unit with said transfer unit, said control unit stops the disk transfer operation being performed by said transfer unit.

14. A disk device according to claim 13, wherein said transfer unit comprises a member for nipping the outer edge of the disk so as to provide a transfer force to the disk, thereby transferring the disk between said stock unit and said rotational driving unit.

15. A method for operating a disk device, said device comprising a driving unit having a rotational driving unit for clamping a disk thereon, said rotational driving unit comprising a turntable, an elastic supporting member for supporting said driving unit within a casing, a locking member for releasably locking said driving unit within the casing, and a transfer unit for transferring a disk between an insertion opening and said rotational driving unit, the method comprising:
  placing said locking member in an unlocked state when there is no disk inserted from said insertion opening, so that said driving unit is elastically supported by said elastic supporting member.

16. A method according to claim 15, wherein said locking member places said driving unit in a locked state when a disk is inserted from said insertion opening.

17. A method according to claim 15, wherein, when an operation error occurs during an operation of discharging a disk to said insertion opening, the disk is returned to said rotational driving unit with said transfer unit so as to be clamped, and said locking member is placed in an unlocked state so that said driving unit stops in a state of being elastically supported by said elastic supporting member.

18. A method according to claim 15, wherein, when a disk is discharged to said insertion opening and said transfer means is stopped with the disk protruding from said insertion opening, but the disk is not extracted from said insertion opening within a predetermined amount of time, said locking member is placed in an unlocked state so that said driving unit stops in a state of being elastically supported by said elastic supporting member.

19. A method for operating a disk device comprising a driving unit having a rotational driving unit for clamping a disk, an elastic supporting member for supporting said driving unit within a casing, a locking member for releasably locking said driving unit within the casing, a stock unit capable of storing a plurality of disks, and a transfer unit for transferring a disk between said stock unit and said rotational driving unit, the method comprising:
  determining whether or not an operation error has occurred during an operation of transferring a disk to said stock unit; and
  if an operation error has occurred, returning the disk to said rotational driving unit with said transfer unit so as to be clamped, and placing said locking member in an unlocked state so that said driving unit stops in a state of being elastically supported by said elastic supporting member.

20. A method according to claim 19, wherein, when disk clamping is not detected within a predetermined amount of time after returning the disk to said rotational driving unit with said transfer unit, the disk transfer operation being performed by said transfer unit is stopped.

* * * * *